July 22, 1941.   L. M. SIGLER   2,249,985
EGG SEPARATOR
Filed Oct. 30, 1939

INVENTOR,
Lawrence M. Sigler
BY Barth & Barth
ATTORNEYS.

Patented July 22, 1941

2,249,985

UNITED STATES PATENT OFFICE 2,249,985

EGG SEPARATOR

Laurence M. Sigler, St. Louis, Mo., assignor of one-third to Kathryn B. Gill, and one-third to James C. Gill, both of San Francisco, Calif.

Application October 30, 1939, Serial No. 301,988

8 Claims. (Cl. 146—2)

The present invention relates to apparatus for separating the yolks from the whites of eggs.

The objects of the invention are to provide an apparatus which will receive the entire contents of the eggs as they are broken or opened, and which is capable of rapidly separating the yolks from the whites during a continuous advancing movement, and to provide an apparatus, all parts of which are simple to construct and easy to clean, and which handles the egg contents in such a gentle manner, throughout their course, that the yolks are not broken.

Other objects and advantages of the invention will become apparent from the following description of a preferred embodiment of the invention. It should be understood that changes may be made in the form, construction and arrangement of the several parts herein shown and described, without departing from the invention as defined in the claims hereto appended.

Reference will be made to the accompanying drawing, in which

Figure 1:
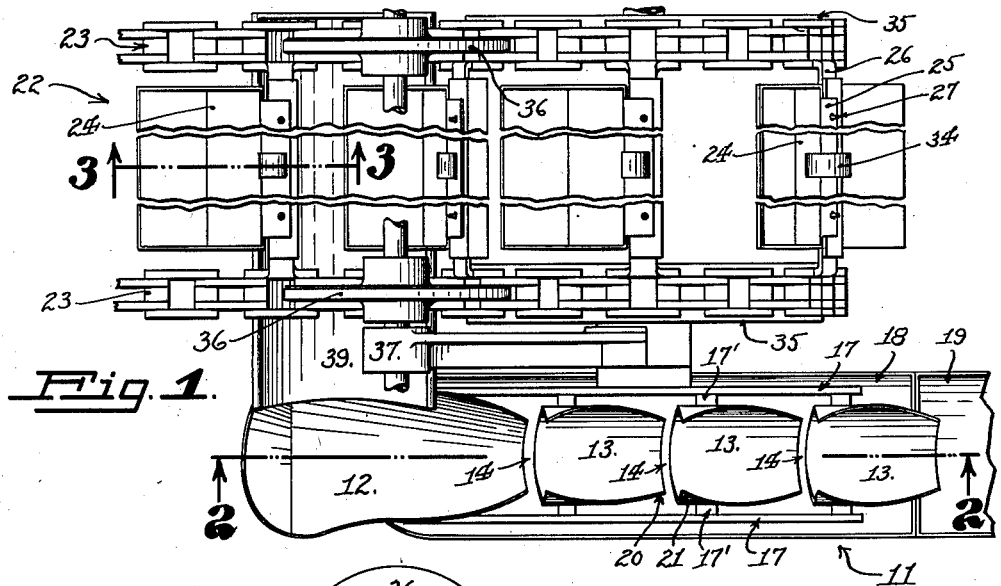
Fig. 1 is a broken plan view of the apparatus.

In the drawing, the reference numeral 11 designates the separator portion of the machine, which comprises a series of trough sections 12 and 13, each having a rounded bottom and upstanding sides. The section 12 is longer and wider than the sections 13, and is the receiving section, into which the whole egg contents are dumped, either directly as the eggs are opened by hand, or by a conveyer to be described later. There are preferably three identical sections 13 following the receiving section 12. Each section is separated from the preceding section by a space or slot 14, and the rear end 15 of each section is elevated slightly above the front end 16 of the succeeding section. The series of sections are on an incline, forming in effect a trough with a stepped and slotted bottom. The sections are preferably supported by longitudinal bars 17 attached to their sides by spacers 17' so that the space beneath them is clear.

The egg contents flow down the trough formed by the series of sections 12 and 13, and as the slots 14 are passed, the whites flow through said slots and drop into a reversely inclined trough 18 beneath, by which they are led to any suitable receptacle, not shown. The yolks, held together by their surrounding membranes, pass over the slots 14 without dropping through, and continue down the series of sections, to drop off the last one into a forwardly inclined trough 19 which carries them to a suitable receptacle, not shown.

The separating action of the trough sections 12 and 13 and their intervening slots 14 is very similar to that employed when opening an egg by hand, when the shell is cut or cracked on one side and opened slightly on the cracked side to allow the white to flow out, while being rocked back and forth to cause the contents to flow across the opened crack several times. The yolk, held together by its membrane, rolls across the crack without dropping through.

The stepping of the trough sections, i. e. the raising of the rear end 15 slightly above the forward end 16 of the succeeding section, enables the yolk to roll across the slot 14 without catching on, and being broken by, the edge of the succeeding section. It does not prevent the white from flowing through the slot. Most of the white flows through the first slot, but a portion of it passes over with a yolk and drops through the second and third slots. Three slots are sufficient to remove all the white from the yolk. A greater number of slots is unnecessary, and would introduce the danger of breaking the yolk.

Experience has shown that a cross section of U-shape is best for the trough sections, with the rear upper corners 20 of each section rounded off, and the forward upper corners 21 square or pointed and slightly bent in toward each other, as shown in the drawing. The portion of the white which lies above and to the sides of the yolk is caught by the inwardly bent sharp corners 21, and caused to drop through the slot, whereas the yolk, being smaller, rolls freely down the trough.

The separator 11 and discharge troughs 18 and 19 may be supported in any convenient manner, not shown, and may be removable for easy cleaning, although, because of their simplicity and accessibility, they can be easily cleaned without removal. It is to be noted that there are no moving parts in the separator portion of the machine.

The whole egg contents may be dumped directly into the receiving section 12 of the separator, if the eggs are opened by hand, or they may be brought to the separator from a remote opening point by a conveyer, as shown at 22 in the drawings. This conveyer comprises a pair of laterally spaced endless chains 23 between which are carried a series of shallow pans 24. Each pan has a horizontal flange 25 at its leading edge, which rests upon a cross bar 26 extending between and rigidly secured to the chains 23. Pins 27 project upwardly from the bar 26 and extend freely through holes in the flange 25.

Figure 3:
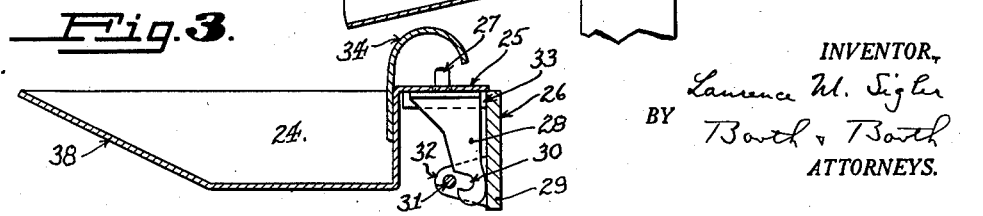
Fig. 3 is a vertical section taken on the line 3—3 of Fig. 1 and enlarged.

The flange 25 of the pan has a downwardly extending hooked lug 28, which bears against a vertical flange 29 formed as a part of the bar 26, and thereby holds the pan in horizontal position, as shown in detail in Fig. 3. The chains 23 are under sufficient tension to keep the bar itself from rotating. When the pan is inverted, on the lower or return run of the conveyor, its free edge drops slightly, causing the hook 30 of the lug 28 to engage a pin 31 fixed to the bar by a lug 32, thereby preventing the pan from dropping away from the bar. When the pan is right side up, on the upper run of the conveyor, it is easily removable by merely lifting it straight up, the hook 30 being then out of engagement with the pin 31. The upper horizontal portion of the bar 26 is cut away, as shown at 33, to permit the lug 28 to pass. A curved finger grip 34 is provided above the flange 25, by which to lift the pan. It is intended that the egg contents will be inspected as they travel along in the conveyer pans, and if a pan is found containing substandard egg contents, it will be removed from the container and washed, while a clean empty pan is put in its place.

Figure 2:
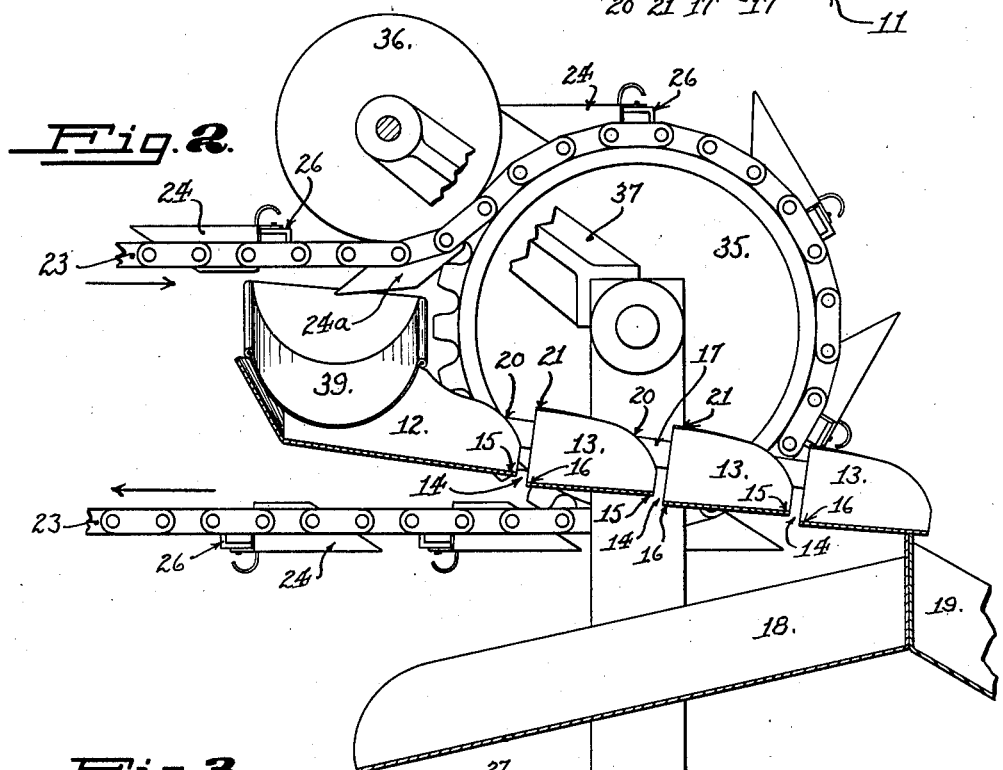
Fig. 2 is a vertical section on the line 2—2 of Fig. 1.

The egg contents are dumped out of the pans 24 rearwardly, rather than forwardly as they go around the end sprockets 35 in the more usual manner. For this purpose the upper runs of the chains 23 pass under idler wheels 36, carried by brackets 37, just before they go around the sprockets 35. This gives the chains an upward inclination, causing the free edges of the pans to tilt downwardly, as shown at 24a in Fig. 2. The bottoms of the pans are inclined upwardly at said free edges, as shown at 38, so that the contents are spilled out rearwardly into a transverse trough 39 which carries them to the separator receiver 12. This rearward dumping of the egg contents results in a minimum amount of tumbling and agitation, the effect being that of gently sliding the pan out from under its contents. Breakage of the yolks is thereby prevented.

It will be seen from the foregoing that my apparatus has a minimum number of moving parts, there being no moving parts whatever in the separating portion of the machine; that all parts with which the egg contents come in contact are easily cleaned and accessible to inspection; that the conveyer is well adapted to inspection of the egg contents and quick removal of any which are seen to be defective or sub-standard; that the egg contents are treated gently and with the least possible agitation throughout their course; and that the machine is capable of handling a large quantity of material in the least possible time, due to the continuity of its operation.

I claim:

1. A separator for whole egg contents comprising a trough formed of a plurality of successive sections separated by intervening slots, each section having a transversely curved bottom and upstanding sides, the sides and bottom of each section being in substantial alignment with the sides and bottom of the adjacent sections, means for causing the egg contents to flow along said trough, the egg whites passing through said slots and the yolks passing along the trough to its end, means beneath the trough for receiving the whites from said slots, and other means for receiving the yolks from the end of the trough.

2. A separator for whole egg contents comprising a trough formed of a plurality of successive sections separated by intervening slots, each section having a transversely curved bottom and upstanding sides, the sides and bottom of each section being in substantial alignment with the sides and bottom of the adjacent sections, the rear end of the bottom of each section being elevated slightly above the front end of the bottom of the next succeeding section, means for causing the egg contents to flow along said trough, the egg whites passing through said slots and the yolks passing along the trough to its end, means beneath the trough for receiving the whites from said slots, and other means for receiving the yolks from the end of the trough.

3. A separator for whole egg contents comprising a trough formed of a plurality of successive sections separated by intervening slots, each section having a transversely curved bottom and upstanding sides, the sides and bottom of each section being in substantial alignment with the sides and bottom of the adjacent sections, the forward upper corners of the sides of each section being bent inwardly from the planes of the sides of the next preceding section, means for causing the egg contents to flow along said trough, the egg whites passing through said slots and the yolks passing along the trough to its end, means beneath the trough for receiving the whites from said slots, and other means for receiving the yolks from the end of the trough.

4. A separator for whole egg contents comprising a trough formed of successive sections separated by intervening slots, each section having a transversely curved bottom and upstanding sides, the rear upper corners of each section being rounded and the forward upper corners of each section being carried above the rounded rear corners of the preceding section, means for causing the egg contents to flow along said trough the egg whites passing through said slots and the yolks passing along the trough to its end, means beneath said trough for receiving the whites from said slots, and other means for receiving the yolks from the end of said trough.

5. A separator for whole egg contents comprising a trough formed of successive sections separated by intervening slots, longitudinal supporting members for said sections positioned at the sides and above the bottom thereof, said supporting members being spaced from the sides of said sections at said slots, means for causing the egg contents to flow along said trough, the egg whites passing through said slots and the yolks passing along the trough to its end, means beneath said trough for receiving the whites from said slots, and other means for receiving the yolks from the end of said trough.

6. A separator for whole egg contents comprising a movable conveyer having a series of pans, an inclined trough transversely disposed beneath said conveyer into which said pans dump their contents, a second trough positioned to receive said contents from the first trough, said second trough being formed of a plurality of successive spaced U shaped sections, each section having a transversely curved bottom and upstanding sides, means positioned to receive the egg whites through the spaces between said sections, and other means positioned to receive the yolks from the end of the last section.

7. A separator for whole egg contents comprising a succession of movable pans having their bottoms inclined upwardly toward their rear edges, means for advancing said pans horizontally, means acting upon said pans to tilt their rear edges downwardly during their advancing movement whereby the egg contents are dumped from said rear edges, a trough formed of successive sections separated by intervening slots, each section being transversely U shaped with a curved bottom and upstanding sides, means for receiving the egg contents from said pans and transferring them to said trough in a flowing stream, the egg whites passing through said slots and the yolks passing along said trough to its end, means beneath said trough for receiving the whites from said slots, and other means for recieving the yolks at the end of said trough.

8. A separator for whole egg contents comprising a laterally spaced pair of endless chains having approximately horizontal runs, a cross bar secured to and extending between said chains, a pan removably carried by said bar, said pan having a flange resting upon the top of said bar and means engaging both the upper and the lower portions of the bar to hold the pan horizontal when on the upper run of the chains, other interengaging means on the pan and the bar cooperating when the pan is inverted on the lower run of the chains to retain it thereon, means for dumping the egg contents from the pan, a trough positioned to receive the egg contents dumped from said pan, said trough having a plurality of successive sections separated by intervening slots, each section being transversely U shaped with a curved bottom and upstanding sides, means for causing the egg contents to flow along said trough, the whites passing through said slots and the yolks passing along said trough to its end, means beneath said trough for receiving the whites from said slots, and other means for receiving the yolks from the end of said trough.

LAURENCE M. SIGLER.